(12) United States Patent
Mazoyer et al.

(10) Patent No.: US 7,398,674 B2
(45) Date of Patent: Jul. 15, 2008

(54) DEVICE FOR PRESSURE MEASUREMENT, PARTICULARLY IN A COMBUSTION CHAMBER OF AN INTERNAL COMBUSTION ENGINE

(75) Inventors: Thierry Mazoyer, Massieux (FR); Patrick Fayet, Tassin la Demi Lune (FR); Jean-Pierre Dumas, Sartrouville (FR); Michel Castagne, Nanterre (FR)

(73) Assignees: Institut Francais du Petrole, Rueil Malmaison Cedex (FR); PSA Peugeot Citroen, La Garenne-Colombes, Cedex (FR); Renault S.A., Boulogne Billancourt Cedex (FR)

( * ) Notice: Subject to any disclaimer, the term of this patent is extended or adjusted under 35 U.S.C. 154(b) by 296 days.

(21) Appl. No.: 10/511,551

(22) PCT Filed: Apr. 16, 2003

(86) PCT No.: PCT/FR03/01208

§ 371 (c)(1),
(2), (4) Date: Jun. 10, 2005

(87) PCT Pub. No.: WO03/087753

PCT Pub. Date: Oct. 23, 2003

(65) Prior Publication Data

US 2005/0223776 A1     Oct. 13, 2005

(30) Foreign Application Priority Data

Apr. 18, 2002   (FR)   ............................... 02 04897

(51) Int. Cl.
*G01L 23/22*   (2006.01)
(52) U.S. Cl. .................. 73/35.12; 73/35.13; 73/115
(58) Field of Classification Search .............. 73/35.12, 73/35.13, 115, 714
See application file for complete search history.

(56) References Cited

U.S. PATENT DOCUMENTS

| 5,195,365 | A  | * | 3/1993 | Chujo et al. ................ 73/115 |
| 5,380,014 | A  | * | 1/1995 | Schaperkotter ............ 73/35.13 |
| 5,659,132 | A  | * | 8/1997 | Novak et al. ................ 73/115 |
| 6,701,775 | B1 | * | 3/2004 | Popielas et al. ............ 73/35.12 |

FOREIGN PATENT DOCUMENTS

| DE | 42 07 495 A1 | 9/1993 |
| DE | 42 25 815 A1 | 2/1994 |
| JP | 2-157629     | 6/1990 |

* cited by examiner

*Primary Examiner*—John E Chapman
(74) *Attorney, Agent, or Firm*—Antonelli, Terry, Stout & Kraus, LLP.

(57) ABSTRACT

The invention relates to a device for measuring at least the pressure of a fluid present in a chamber (16), comprising a sensitive element (36) arranged in a housing (38), supported by a joint (10) inserted between two elements (12, 14) which form said chamber. According to the invention, the housing (38) is open in the direction of the chamber (16) and the sensitive element (36) is enclosed in a material (67) filling said housing.

26 Claims, 6 Drawing Sheets

DEVICE FOR PRESSURE MEASUREMENT, PARTICULARLY IN A COMBUSTION CHAMBER OF AN INTERNAL COMBUSTION ENGINE

FIELD OF THE INVENTION

The present invention relates to a device for measuring at least the pressure of a fluid present in a chamber.

It more particularly relates to a device for measuring the pressure in a combustion chamber of an internal-combustion engine.

More specifically, it is aimed at a device allowing to control the combustion and more particularly the engine knock that occurs in this combustion chamber of the engine.

BACKGROUND OF THE INVENTION

Document EP -0,472,219 describes a device for measuring the pressure that prevails in a combustion chamber of an internal-combustion chamber.

This device comprises a seal interposed between the cylinder head of this engine and the engine block, and it is in tight contact with the respective faces of this cylinder head and of this engine block. The seal, of multisheet type, comprises an upper metal sheet and a lower metal sheet between which an intermediate sheet bearing a housing that receives a pressure-sensitive element is arranged.

A pressure inlet bringing the pressure to a measuring surface arranged parallel to the face of the cylinder head or to the face of the engine block is provided to measure the pressure prevailing in the combustion chamber.

This measuring device however has significant drawbacks.

In fact, the pressure inlet can be clogged, or its section at least reduced, by a coke deposit usually generated by combustion. Transfer of the fluid under pressure from the combustion chamber to the measuring surface may therefore be non-existent or greatly disturbed.

Furthermore, it is necessary to either use a seal of great thickness to make the housing intended to receive the sensitive element and the measuring inlet, which requires adjustment of the assembly made up of the cylinder head, the engine block and the piston, or to provide machining work at the level of the cylinder head, thus embrittling it, which may even lead to sealing losses at these machined points or require additional sealing at this level.

Finally, the presence of such a pressure inlet changes the level, the shape, the frequency and the phase of the pressure wave coming from the combustion chamber.

The present invention aims to overcome the aforementioned drawbacks by means of a measuring device of simple design, of relatively low cost and quasi-reliable as regards measurement.

SUMMARY OF THE INVENTION

The present invention thus proposes a device for measuring at least the pressure of a fluid present in a chamber, said device comprising a sensitive element placed in a housing borne by a seal interposed between two elements forming said chamber, characterized in that the housing is open in the direction of the chamber and the sensitive element is coated with a material filling said housing.

The seal can comprise a pile of two extreme sheets between which a multiplicity of intermediate sheets is arranged and the housing can be delimited by said extreme sheets and at least one intermediate sheet.

At least one intermediate sheet can comprise a cut open in the direction of the chamber.

At least one intermediate sheet can comprise electric connection means between the sensitive element and a measuring means.

The electric connection means can be borne by an intermediate sheet in form of a film on which a printed circuit comprising at least one electric conductor between the sensitive element and the measuring means can be formed.

The sheets can be electrically insulated in relation to one another by at least one sheet in form of a plate, a layer or an insulating deposit.

Two of the opposite vertical faces of the sensitive element can be connected to the electric connection means.

Two of the opposite horizontal faces of the sensitive element can be connected to the electric connection means.

The sensitive element can be connected to the electric connection means by a conducting glue.

The sensitive element can be connected to the electric connection means by at least one conducting element.

The sheets can be joined together by glueing and this glueing operation can be carried out by interposing a glue layer.

At least the extreme sheets can be made of metal and at least the central sheet of the intermediate sheets can also be made of metal.

The material filling the housing can be a resin withstanding high temperatures.

The face of the housing in the direction of the chamber can be covered by a protective element.

The protective element can comprise a wall covering said face and the ends of said wall can be folded back over the extreme sheets of the seal.

The sensitive element can be of piezoelectric or piezoresistive type.

The seal can be a cylinder head gasket arranged between the cylinder head and the engine block of an internal-combustion engine.

The seal can comprise a temperature-sensitive element.

The present invention can be applied to the measurement, detection or analysis of engine knock in the combustion chamber of an internal-combustion chamber.

The invention can also be applied to characterization of the combustion in at least one combustion chamber of an internal-combustion engine.

This invention can also be applied to engine knock location in the combustion chamber of an internal-combustion engine.

BRIEF DESCRIPTION OF THE FIGURES

Other features and advantages of the invention will be clear from reading the description hereafter, given by way of non-limitative example, with reference to the accompanying figures wherein.

DETAILED DESCRIPTION

Figure 1:
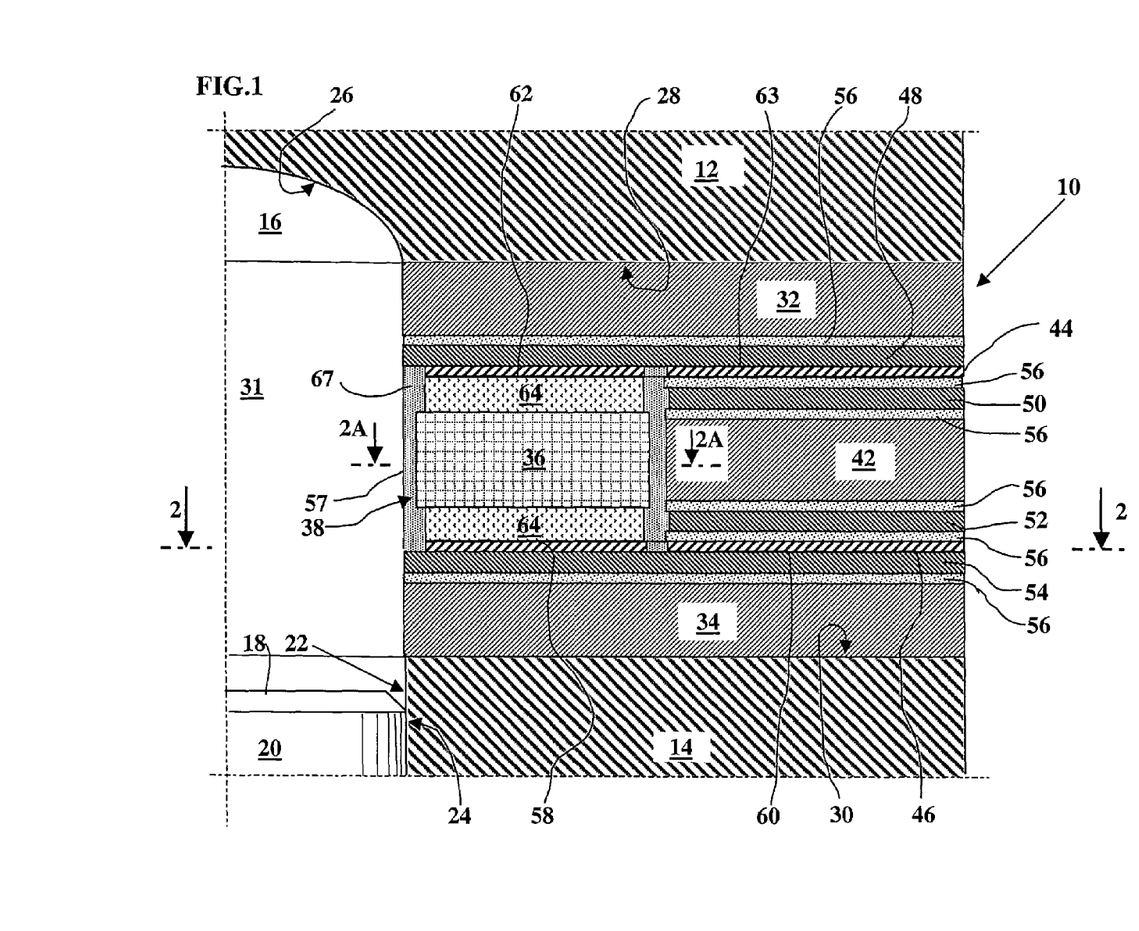
FIG. 1 is a large-scale diagrammatic view, in partial section, of a measuring device according to the invention.

FIG. 1 shows a device for measuring the pressure of a fluid present in a chamber.

More precisely, in connection with the description hereafter, which is only given by way of example, the measured pressure is the pressure resulting from the combustion of a fuel mixture in a combustion chamber of an internal-combustion engine.

Of course, any other parameter of the fluid, such as its temperature, can be measured by the device according to the invention.

With reference to FIG. 1, the measuring device comprises a seal 10 interposed between a first element such as a cylinder head 12 and a second element such as an engine block 14 of an internal-combustion engine whose combustion chamber 16 is delimited by the upper face 18 of a piston 20, the circular wall 22 of a cylinder 24 arranged in engine block 14 and the cavity 26 of cylinder head 12 opposite piston 20.

This seal, commonly referred to as cylinder head gasket, is generally used mainly to prevent leakage between the opposite faces 28, 30 of cylinder head 12 and engine block 14 respectively, and it mainly comprises circular openings 31 having the same diametral dimension as combustion chambers 16 and corresponding therewith.

Seal 10 is a seal in form of a pile of sheets, layers, plates, strips or films on top of each other comprising each at least one circular opening forming opening 31 of the seal. It comprises an upper extreme sheet 32 and a lower extreme sheet 34 arranged at a distance from the upper sheet, these sheets being preferably rigid and made of metal, advantageously steel, and extending over the surface of face 28 of cylinder head 12 and of face 30 of engine block 14.

At least one sensitive element 36, preferably a pressure-sensitive element, advantageously at least four, whose purpose is to measure the pressure prevailing in combustion chamber 16, is housed between these two sheets.

A housing 38 intended to receive each sensitive element is therefore provided between the extreme sheets. This housing consists of a cut 40 with an open face, for example a lying U-shaped cut, provided in a multiplicity of intermediate sheets. This housing is so arranged that its open face opens onto combustion chamber 16 (see FIG. 2).

The intermediate sheets include a central intermediate sheet 42, preferably rigid and made of metal, advantageously steel, having the same extension as said extreme sheets and comprising a lying U-shaped cut 40 and additional intermediate sheets, plates or layers arranged between extreme sheets 32 and 34 and central sheet 42. Part of these additional sheets also comprises a U-shaped cut so as to provide housing 38 when piling up this part of additional sheets and the central sheet.

Two of these additional intermediate sheets consist of films 48, 54 bearing electric circuits 44 and 46, preferably opposite sensitive element 36, allowing to connect this sensitive element to an external measuring means comprising a supply or polarization or amplification or conditioning circuit (not shown) for the sensitive element. One 48 of these films is positioned between upper sheet 32 and central sheet 42, and the other 54 is positioned between this central sheet 42 and lower sheet 34.

Advantageously, these circuits are electrically insulated from sheets 32, 34 and 42 by other additional intermediate sheets in form of insulating plates arranged on either side of these electric circuits.

Electric insulations can also be obtained by depositing an insulant on the electric circuits, such as a varnish or paint layer deposit on the circuits. This insulation can also be obtained by means of an insulating surface treatment such as an anodizing, which creates an insulating surface layer on the electric circuits.

As can be seen in FIG. 1, an insulating plate 50 is arranged between circuit 44 borne by film 48 and central sheet 42, with the same extension as central sheet 42 and the same cut as this central sheet. Similarly, an insulating plate 52 identical to plate 50 is arranged between central sheet 42 and electric circuit 46 borne by film 54. The sheets, plates and films are joined together fixedly, preferably by means of glue layers 56, advantageously insulating glue layers.

Housing 38 thus results from piling the sheets and plates, it consists of the U-shaped cuts 40 provided in central sheet 42 and plates 50 and 52, and it comprises a vertical face 57 open onto the combustion chamber. This housing thus comprises two horizontal walls made up of extreme sheets 32, 34 and intermediate sheets 48, 54, and three vertical walls provided by the U-shaped cuts in central sheet 42 and insulating plates 50, 52.

Figure 2:
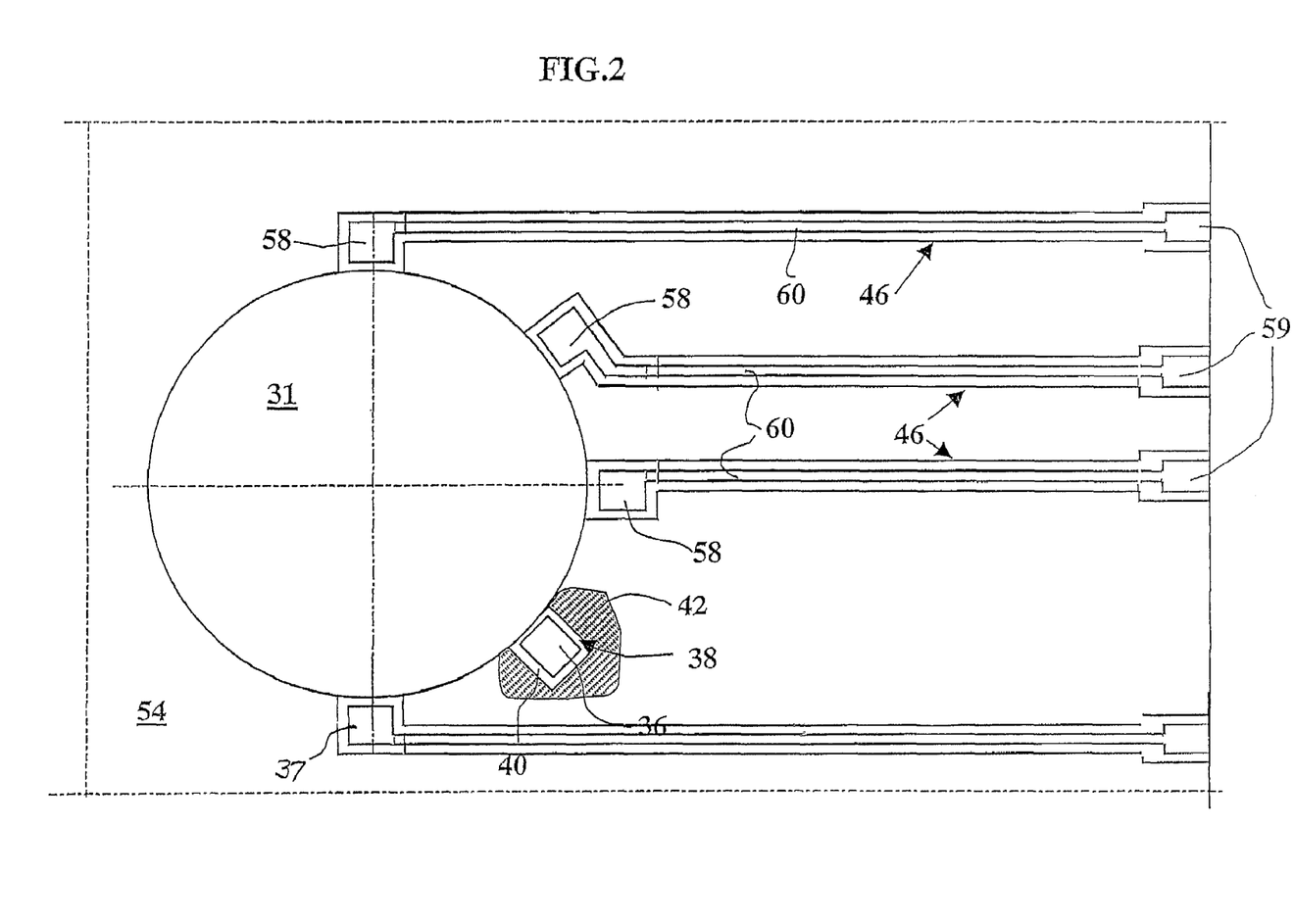
FIG. 2 is a diagrammatic view in partial section along line 2-2 of FIG. 1 with a local section along line 2a-2a of the same figure.

The electric circuits are provided in form of printed circuits and can be produced by means of the serigraphic film connection technology as shown in FIG. 2.

With reference to this figure, each circuit 46 provided on film 54 comprises a connection pin 58 arranged in housing 38 in line with sensitive element 36 and opposite the latter, a connection plug 59 arranged on the edge of the cylinder head and to which the external measuring means is connected, and a conductor 60 connecting the pin to the plug.

Of course, each circuit 44 provided on film 48 is equally designed and made by means of the same technology as the circuits of film 54, and it therefore comprises a pin 62, a connection plug and a conductor 63.

Sensitive element 36, which is a thin sensitive element, has a sensitivity of some tenths of a bar, it withstands the maximum pressures and temperatures that prevail in the combustion chambers of engines and withstands chemical attacks such as those of gases generated by the combustion.

Advantageously, this sensitive element is a piezoelectric or piezoresistive type sensitive element.

With reference to FIG. 1, sensitive element 36 is placed in housing 38 in such a way that, on the one hand, it is slightly set back in relation to the surface of cylinder 24 and that, on the other hand, none of its vertical faces, in relation to the plane of the extreme sheets, rests against any vertical face of housing 38.

Preferably, this sensitive element is electrically connected by any means to pins 58, 62 by two of its opposite horizontal faces.

Figure 3:
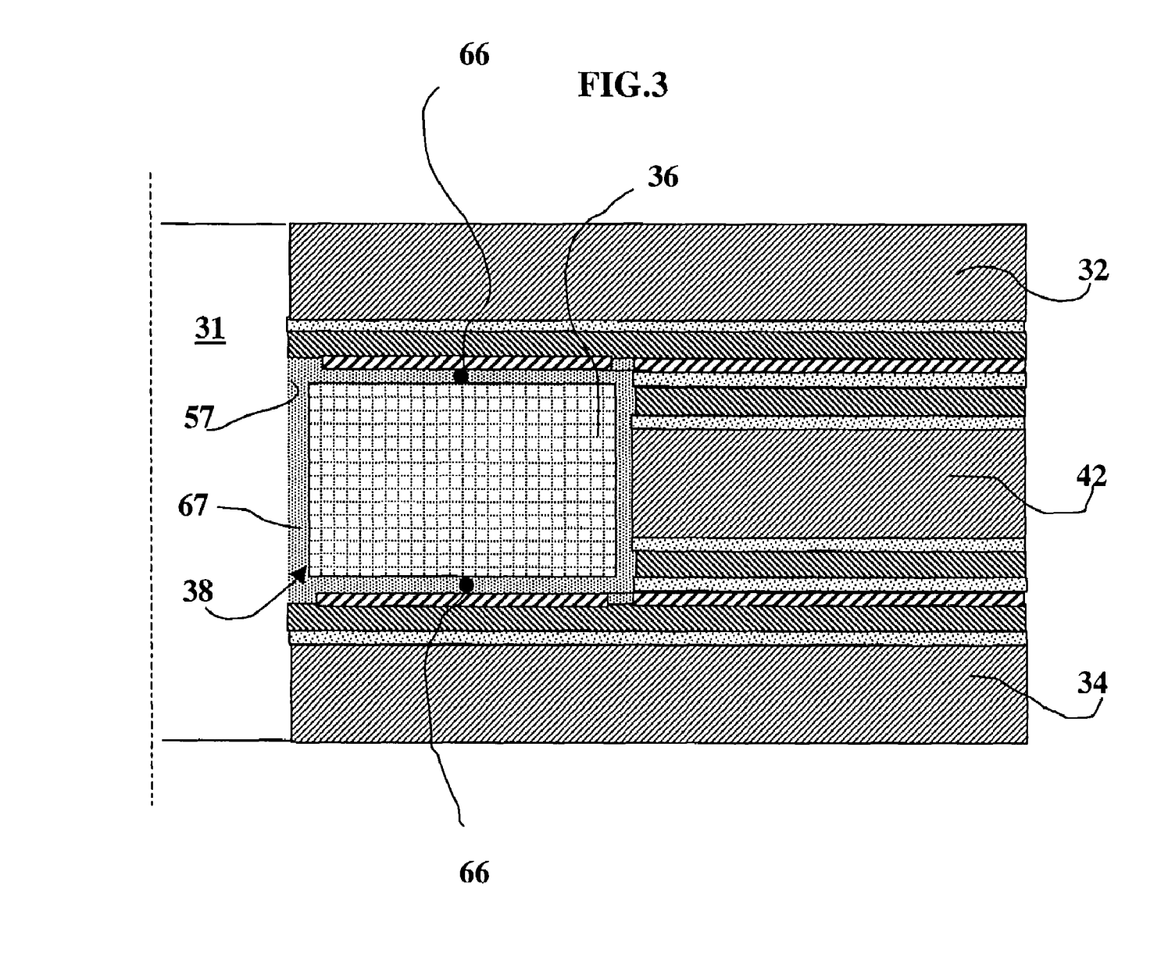
FIG. 3 is a variant of FIG. 1.

This electric connection can be obtained by glueing, for example with a conducting glue 64 as shown in FIG. 1, or by interposing between the face(s) of the sensitive element and the pin(s) at least one conducting cylindrical element 66 as illustrated in FIG. 3.

Once the sensitive element set and the connections achieved, the sensitive element is coated with a material 67 so as to fill in all of housing 38. This embodiment allows to seal the sensitive element in relation to the combustion chamber, to protect this sensitive element against the chemical and thermal attacks due to combustion and to provide good transmission of the pressure waves, notably at high frequencies. This material is flush with the surface of cylinder 24 on open face 57 of this housing.

The coating material used is preferably a resin withstanding high temperatures.

Thus, the pressure prevailing in the combustion chamber is retransmitted to the faces of the sensitive element which deforms by generating a voltage or a voltage fluctuation transmitted to the external measuring means by electric circuits 44 and 46, via the horizontal faces of this sensitive element, the conducting glue and/or the conducting cylindrical element.

The sensitive element thus provides real-time measurement of the pressure or the pressure range prevailing in the combustion chamber in the vicinity of the sensitive element.

The seal 10 can also include a temperature-sensitive element 37 as shown in FIG. 2.

Furthermore, the seal obtained affords the advantage of being a very thin seal of thickness ranging between 0.5 and 1.5 mm, advantageously between 0.8 and 1 mm, preferably 1 mm.

Figure 4:
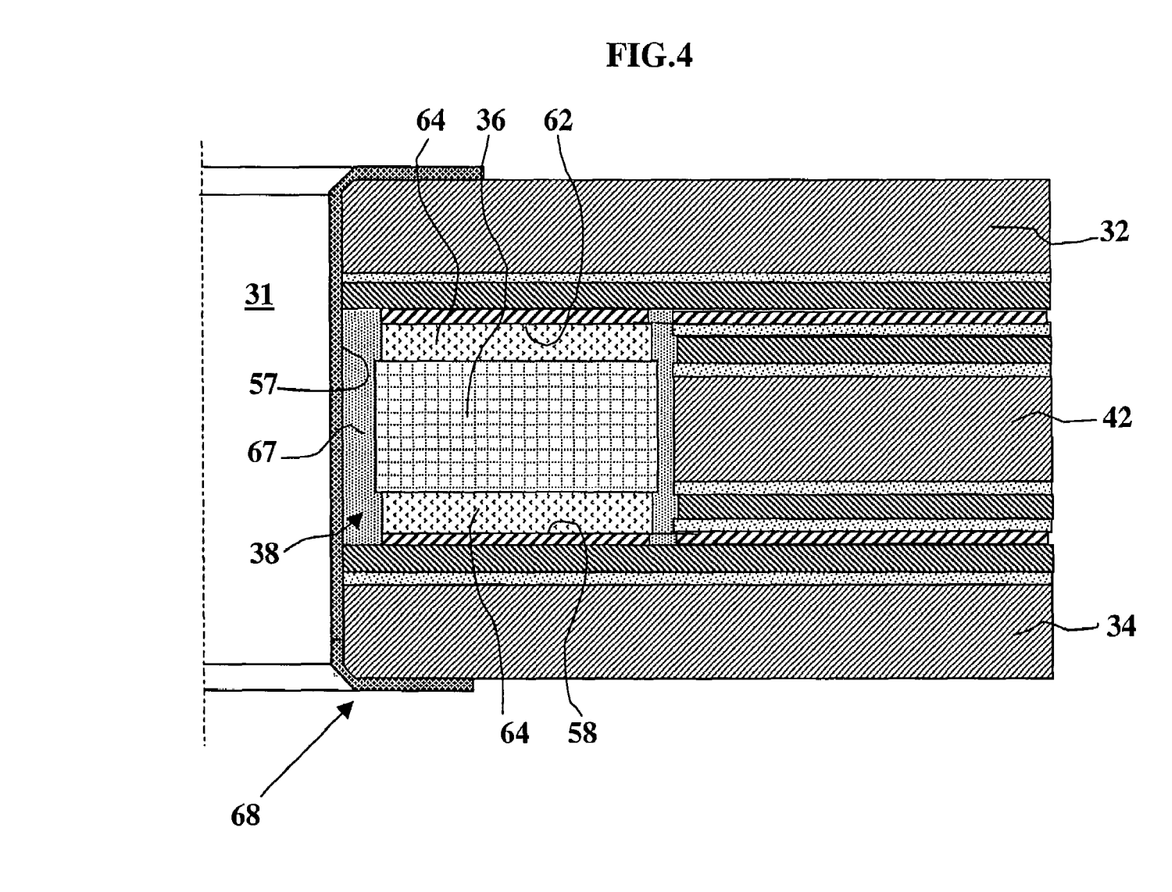
FIG. 4 is another embodiment variant of FIG. 1.

Advantageously, with reference to FIG. 4, the peripheral edge of opening 31 and consequently the open face 57 of housing 38 can be covered by a protective element 68 that protects sensitive element 36 and the electric connections against the high temperatures prevailing in the combustion chamber and also provides sealing of the sheet piles as regards the combustion gases.

This protective element, referred to as fire break, is a ring having a U-shaped section where the base of the U rests on the whole of the peripheral edge of opening 31 while covering the open face 57 of each housing and where the stems of the U respectively rest against upper sheet 32 and lower sheet 34.

This fire break is advantageously made of coppery metal or of any other metal allowing easy forming and having a low rigidity so as not to hinder transmission of the pressure wave to the sensitive element.

Figure 5:
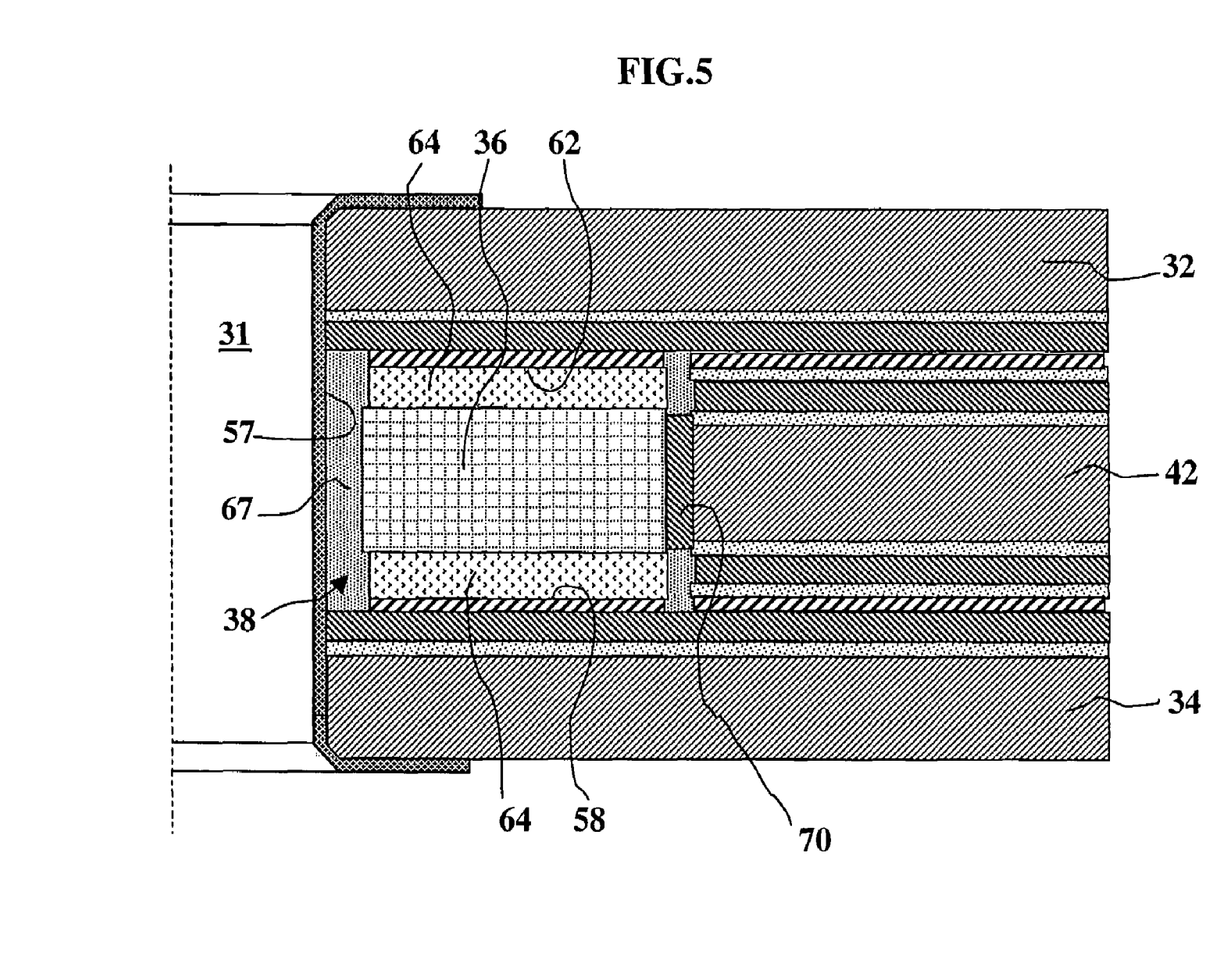
FIG. 5 is another variant of the invention, and FIG. 6 yet another variant of the invention.

With reference to FIG. 5, which shows a variant of the invention and therefore comprises the same reference numbers as FIG. 1, sensitive element 36 is arranged in housing 38 in such a way that the rear vertical face of this element rests by means of an insulating plate 70 against the edge of central sheet 42. The rear face is understood to be the face of the sensitive element opposite that facing the combustion chamber.

In this case, the electric connections between the horizontal faces of sensitive element 36 and pins 58, 62 are provided, as previously described in connection with FIG. 1, by a conducting glue 64 or by at least one conducting cylindrical element, as shown in FIG. 3.

Figure 6:
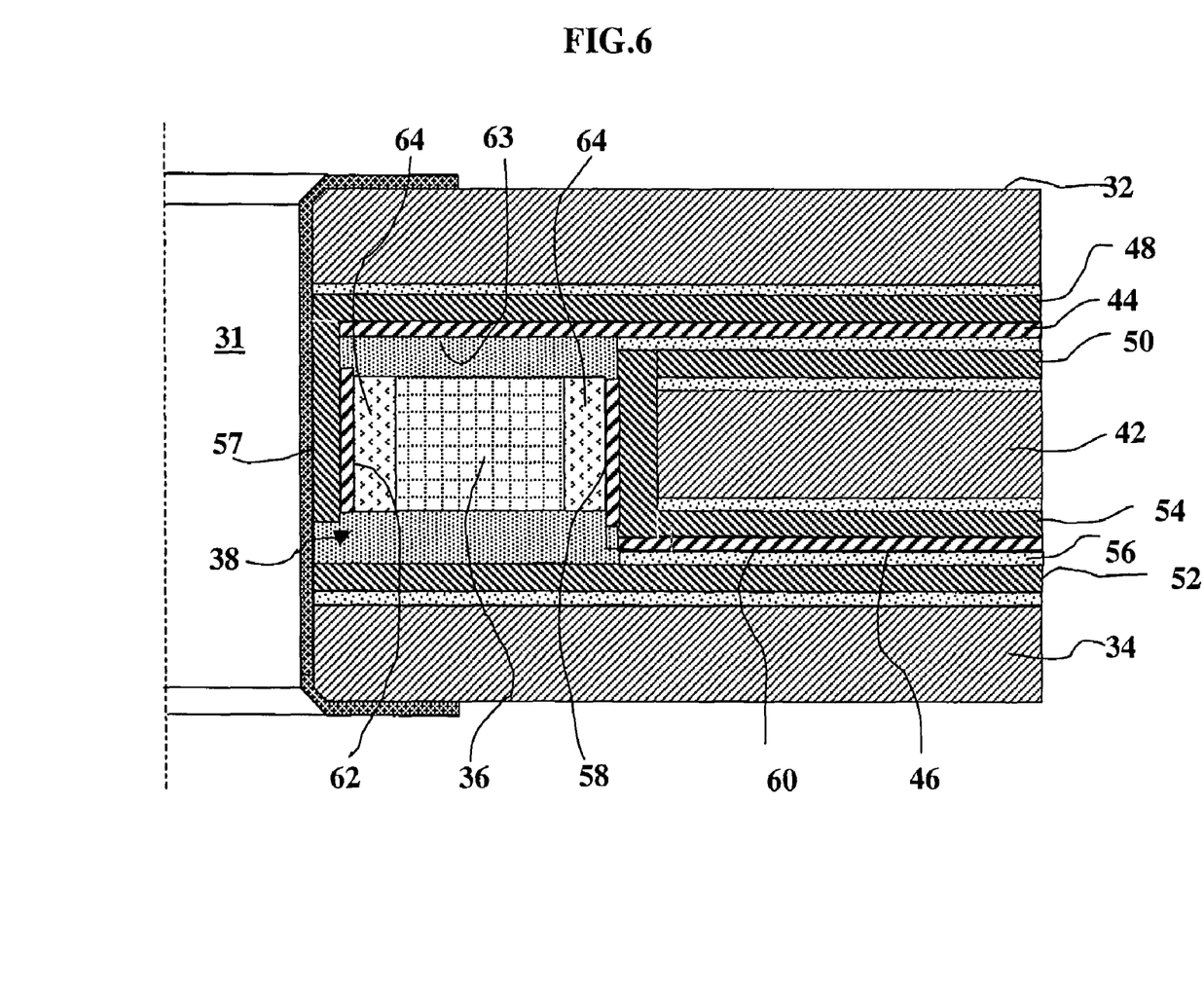

FIG. 6 shows another variant for mounting sensitive element 36 in housing 38.

In this variant, the faces of sensitive element 36 connected to pins 58 and 62 are two opposite vertical faces forming the continuation of the open face 57 of housing 38.

In order to provide the electric connections, always opposite one another, pins 58 and 62 are orthogonal in relation to conductors 60, 63 and they are connected to the vertical faces of the sensitive element by a conducting glue 64.

In the example of this figure, the intermediate sheet in form of film 48 bearing electric circuit 44 is located at the same point as that described in connection with FIG. 1 and comprises an orthogonal part, in the vicinity of open face 57, while facing sensitive element 36, and bearing connection pin 62. In this case, an insulating plate 50 is arranged between circuit 44 borne by intermediate sheet 48 and central sheet 42, with the same extension as central sheet 42, and it is provided with a cut identical to that of this central sheet.

Intermediate sheet 54 bearing electric circuits 46 is also arranged between central intermediate sheet 42 and the lower extreme sheet, and it comprises an orthogonal part, located at a distance from the orthogonal part of film 48 and in the vicinity of the edge of intermediate sheet 42, while facing sensitive element 36 and bearing connection pin 58. Insulating plate 52 is positioned, in this seal configuration, between circuit 46 borne by intermediate sheet 54 and lower extreme sheet 34.

Of course, as described above, the sheets, the plates and the films are joined together fixedly, preferably by means of glue layers 56.

The present invention finds its application in many fields such as measurement of the temperature of a fluid in gaseous or liquid form present in a chamber.

In case of pressure measurement, its application can be mainly directed towards characterization and control of normal combustion, such as evaluation of the indicated mean effective pressure (IMEP) or of the maximum cylinder pressure, or characterization and control of abnormal combustion.

A particular application lies in the detection and analysis of engine knock, or its location as described in French patent application No. 00/14,085, filed Oct. 31, 2000, corresponding to U.S. patent application Ser. No. 09/984,832, filed Oct. 31, 2001, published as US 2002/0050162 A1.

The present invention is not limited to the examples described above and it includes all equivalent variants.

Notably, the sensitive element can be of another type, such as a sensitive element with a semiconductor element.

The invention claimed is:

1. A measuring device for measuring at least the pressure of a fluid present in a chamber, said device comprising a sensitive element placed in a housing provided within a seal interposed between two elements forming said chamber, characterized in that the housing is open in the direction of the chamber and surrounded by the seal in all other directions and the sensitive element is coated at its end facing the chamber and at its end opposite the end facing the chamber with a material filling the housing.

2. A measuring device as claimed in claim 1, characterized in that the seal comprises a pile of two extreme sheets between which a multiplicity of intermediate sheets is arranged and the housing is delimited by said extreme sheets and at least one intermediate sheet.

3. A measuring device as claimed in claim 2, characterized in that at least one intermediate sheet comprises a cut open in the direction of chamber.

4. A measuring device as claimed in claim 2, characterized in that at least one intermediate sheet comprises electric connection means between sensitive element and a measuring means.

5. A measuring device as claimed in claim 4, characterized in that electric connection means are borne by an intermediate sheet in form of a film on which a printed circuit comprising at least one electric conductor between sensitive element and the measuring means is formed.

6. A measuring device as claimed in claim 4, characterized in that two of the opposite vertical faces of the sensitive element are connected to the electric connection means.

7. A measuring device as claimed in claim 4, characterized in that two of the opposite horizontal faces of the sensitive element are connected to the electric connection means.

8. A measuring device as claimed in claim 4, characterized in that sensitive element is connected to the electric connection means by a conducting glue.

9. A measuring device as claimed in claim 4, characterized in that sensitive element is connected to the electric connection means of the at least one intermediate sheet by at least one conducting element.

10. A measuring means as claimed in claim 2, characterized in that the sheets are electrically insulated from one another by at least one sheet in form of a plate, layer or insulating deposit.

11. A measuring device as claimed in claim 2, characterized in that the sheets are joined together by glueing.

12. A measuring device as claimed in claim 11, characterized in that glueing is carried out by interposing a glue layer.

13. A measuring device as claimed in claim 2, characterized in that at least extreme sheets are made of metal.

14. A measuring device as claimed in claim 2, characterized in that at least the central sheet of the intermediate sheets is made of metal.

15. A measuring device as claimed in claim 2, characterized in that at least the extreme sheets extend to the chamber.

16. A measuring device as claimed in claim 2, characterized in that at least the extreme sheets and outer ones of the intermediate sheets extend to the chamber.

17. A measuring device as claimed in claim 1, characterized in that the material filling the housing is a resin withstanding high temperatures.

18. A measuring device as claimed in claim 1, characterized in that face of the housing in the direction of the chamber is covered with a protective element.

19. A measuring device as claimed in claim 18, characterized in that the protective element comprises a wall covering face and the ends of said wall are folded back over extreme sheets of the seal.

20. A measuring device as claimed in claim 1, characterized in that the sensitive element is of piezoelectric or piezoresistive element.

21. A measuring device as claimed in claim 1, characterized in that the seal is a cylinder head gasket arranged between the cylinder head and the engine block of an internal-combustion engine.

22. A measuring device as claimed in claim 1, characterized in that the seal comprises a temperature-sensitive element.

23. A method, comprising using at least one measuring device as claimed in claim 1 for engine knock measurement, detection and analysis in the combustion chamber of an internal-combustion engine.

24. A method, comprising using at least one measuring device as claimed in claim 1 for combustion characterization in at least one combustion chamber of an internal-combustion engine.

25. A method, comprising using at least one measuring device as claimed in claim 1 to determine engine knock location in the combustion chamber of an internal-combustion engine.

26. A measuring device as claimed in claim 1, characterized in that at least outer layers of said seal extend to the chamber.

* * * * *